United States Patent
Jindai et al.

(10) Patent No.: US 8,545,141 B2
(45) Date of Patent: Oct. 1, 2013

(54) TWIST DRILL

(75) Inventors: Masaki Jindai, Itami (JP); Yoshiji Sato, Itami (JP); Makoto Abe, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 800 days.

(21) Appl. No.: 12/681,714

(22) PCT Filed: Oct. 22, 2008

(86) PCT No.: PCT/JP2008/069118
§ 371 (c)(1),
(2), (4) Date: Apr. 5, 2010

(87) PCT Pub. No.: WO2009/054400
PCT Pub. Date: Apr. 30, 2009

(65) Prior Publication Data
US 2010/0215452 A1  Aug. 26, 2010

(30) Foreign Application Priority Data
Oct. 26, 2007  (JP) ................................. 2007-278427

(51) Int. Cl.
*B23B 51/02* (2006.01)
(52) U.S. Cl.
USPC ....................................................... 408/230
(58) Field of Classification Search
USPC ................................... 408/227, 230
IPC ........................................... B23B 51/00, 51/02
See application file for complete search history.

(56) References Cited

U.S. PATENT DOCUMENTS

| 4,583,888 A | 4/1986 | Mori et al. |
| 5,230,593 A | 7/1993 | Imanaga et al. |
| 5,716,172 A * | 2/1998 | Nakamura et al. ............ 408/230 |
| 6,431,962 B1 | 8/2002 | George |
| 2003/0039522 A1 | 2/2003 | Yanagida et al. |
| 2003/0175086 A1* | 9/2003 | Muhlfriedel et al. .......... 408/230 |
| 2004/0101379 A1* | 5/2004 | Mabuchi et al. .............. 408/230 |

FOREIGN PATENT DOCUMENTS

| DE | 10 2008 023 856 A1 | 11/2009 |
| EP | 1 275 458 A1 | 1/2003 |
| JP | 60-120712 U | 8/1985 |
| JP | 61-141007 U | 9/1986 |

(Continued)

OTHER PUBLICATIONS

European Search Report issued in European Patent Application No. EP 08842770.3 dated Sep. 6, 2010.

*Primary Examiner* — Daniel Howell
*Assistant Examiner* — Michael Vitale
(74) *Attorney, Agent, or Firm* — McDermott Will & Emery LLP

(57) ABSTRACT

A flute spread angle θ in a drill axis-perpendicular section of a spiral flute is defined, a region of the flute taking part in chip treatment is formed along a first circle along an cutting edge of a concave curve and a second circle inscribed in this circle, both of the first circle and the second circle are circumscribed on a third circle expressing the web thickness, the radius R of the first circle and the radius R1 of the second circle are in the range of 0.40 D to 0.70 D and in the range of 0.15 D to 0.30 D respectively, and a drill rotational direction front portion of the spiral flute is formed on the second circle to be closer to the drill center than a fourth circle having a diameter of 0.65 D.

3 Claims, 4 Drawing Sheets

(56) References Cited

FOREIGN PATENT DOCUMENTS

| | | |
|---|---|---|
| JP | 63-318208 | 12/1988 |
| JP | 02-124208 | 5/1990 |
| JP | 07237017 A * | 9/1995 |
| JP | 2001-096411 | 4/2001 |
| JP | 2003-025125 | 1/2003 |
| JP | 2003048110 A * | 2/2003 |
| JP | 2007-229900 | 9/2007 |
| WO | WO 2009/138064 A1 | 11/2009 |
| WO | WO 2010/038279 A1 | 4/2010 |

* cited by examiner

TWIST DRILL

RELATED APPLICATIONS

This application is the U.S. National Phase under 35 U.S.C. §371 of International Application No. PCT/JP2008/069118, filed on Oct. 22, 2008, which in turn claims the benefit of Japanese Application No. 2007-278427, filed on Oct. 26, 2007, the disclosures of which Applications are incorporated by reference herein.

TECHNICAL FIELD

The present invention relates to a twist drill utilized for drilling a metal workpiece, more detailedly a twist drill enabling working under high-efficiency conditions by providing excellent chip discharging performance.

BACKGROUND ART

Drills for metal working, particularly drills comprising cutting edges forming concave curves in drill axis end view are disclosed in the following Patent Documents 1 and 2 etc.

In a twist drill disclosed in Japanese Patent Laying-Open No. 2-124208 (Patent Document 1), it is assumed that the web thickness of the drill is 20 to 35% of the drill diameter and the shape of a spiral flute in drill axis end view is concaved on a cutting edge outer end with respect to a perpendicular line orthogonal to a straight line connecting the cutting edge outer end and the drill center with each other, the distance from the aforementioned perpendicular line to the wall surface of the spiral flute is set to 45 to 65% of the drill diameter while the flute width ratio is set to 0.9 to 1.2, and the radius of curvature around the bottom portion of the spiral flute coming into contact with a virtual column expressing the web thickness is set to 15 to 20% of the drill diameter, in order to unforcedly curl and treat chips.

In a drill disclosed in Japanese Patent Laying-Open No. 2001-96411 (Patent Document 2), a spiral flute is sigmoidally spread from a portion in contact with the web thickness toward a heel portion in axis-perpendicular sectional view of the drill, a protrusion is provided on the heel portion of the flute, and the distance from the forward end of the protrusion to a drill rotational direction front portion of the spiral flute is defined, in order to prevent chipping of the heel portion resulting from gripping of chips and cancel insufficient lubrication of the spiral flute (chip discharging flute) with a coolant.

Patent Document 1: Japanese Patent Laying-Open No. 2-124208
Patent Document 2: Japanese Patent Laying-Open No. 2001-96411

DISCLOSURE OF THE INVENTION

Problems to be Solved by the Invention

While it is assumed in Patent Document 1 that reduction of cutting resistance and prevention of clogging can be attained by the aforementioned setting, it has been necessary for the drill of this document to further improve chip control performance under further high-efficiency conditions. This also applies to the drill according to Patent Document 2.

In conventional twist drills including those disclosed in Patent Documents 1 and 2, shapes and control situations of chips have varied with working conditions and workpiece characteristics, to cause such disadvantages that design responsive to conditions and design responsive to the types of workpieces are required and the manufacturing cost is increased.

When there is a drill excellently controlling and discharging chips regardless of changes in working conditions and workpiece characteristics, it is possible to improve working efficiency by increasing the cutting speed and the feed rate. Further, it is also possible to reduce the manufacturing cost by unifying the types of drills.

The present invention aims at making it possible to extensively cope with changes in working conditions and workpiece characteristics, and making it possible to perform working in higher efficiency than conventional drills.

Means for Solving the Problems

In order to solve the aforementioned problems, the present invention has let a twist drill comprise a cutting edge forming a concave curve in drill axis end view, a spiral flute having a flute spread angle set to the range of 80° to 110° in drill axis-perpendicular sectional view, and a thinning flute reducing the width of a chisel edge, a region of the said spiral flute taking part in chip control is formed along a first circle along the said cutting edge and a second circle inscribed in the first circle in drill axis-perpendicular sectional view, both of the first circle and the second circle are circumscribed on a third circle expressing the web thickness, the radius R of the said first circle is in the range of 0.40 D to 0.70 D and the radius R1 of the said second circle is in the range of 0.15 D to 0.30 D respectively assuming that D represents the drill diameter, and a drill rotational direction front portion of the said spiral flute is formed along the said second circle to be closer to the drill center than a fourth circle concentric with the drill center (rotation center) and having a diameter of 0.65 D.

All of the first to fourth circles mentioned here are virtual circles utilized in design.

Preferably in this drill, the rake angle (radial rake γ of the peripheral portion of the cutting edge) of a peripheral cutting edge formed by a leading edge of a margin portion is set positive, and cutting edge reinforcement by chamfering is performed on the peripheral cutting edge having the positive rake angle.

The above wording "cutting edge forming a concave curve" stands for such a shape that the cutting edge enters into a drill rotational direction back portion from a straight line parallel to a reference line coming into contact with the said third circle on one point and reaching an outer end of the cutting edge in drill axis end view. Further, the above term "flute spread angle" stands for an angle formed by a straight line reaching the outer end of the cutting edge from the drill center and a straight line extending from the drill center toward an outer diameter side through the drill rotational direction front portion of the spiral flute in drill axis-perpendicular sectional view.

The radial rake γ (=rake angle α of the peripheral cutting edge) of the peripheral portion of the cutting edge is preferably about 1 to 20°.

Effects of the Invention

In the drill according to the present invention, the cutting edge is in the form of a softly bent concave curve, and thickness changes result in formed chips due to this cutting edge shape. Further, the positive radial rake γ is provided on the peripheral portion of the cutting edge due to the concave curve of the cutting edge, and flow of the formed chips is controlled.

Further, the drill rotational direction front portion of the spiral flute is formed along the said second circle to be present on a position closer to the drill center (closer to the drill center than the fourth circle concentric with the drill center and having the diameter of 0.65 D), whereby chips scraped by the cutting edge of the concave curve reach the drill rotational direction front portion while discharge energy is relatively large, to be excellently controlled by a flute wall formed along the second circle. In addition, chips scraped by the cutting edge of the thinning flute portion also smoothly flow into the spiral flute with small resistance.

Stable chip shapes and stable chip control performance are obtained due to these synergistic effects and optimization of the shape of the cutting edge and the shape of the spiral flute, and it is possible to cope with extensive changes in working conditions and extensive changes in workpiece characteristics by the same drill. Further, the copeable range so spreads that neither design responsive to conditions nor design responsive to the types of workpieces is required, and it is also possible to reduce the manufacturing cost by unifying the types of drills.

In the drill provided with the peripheral cutting edge having the positively set rake angle, sharpness of the peripheral cutting edge is improved to improve the cutting performance. On the other hand, strength of the peripheral cutting edge is conceivably reduced, while it is possible to compensate for insufficient strength of the peripheral cutting edge by performing cutting edge reinforcement by chamfering on the peripheral cutting edge.

DESCRIPTION OF THE REFERENCE SIGNS 1 drill body, 2 land portion, 3 cutting edge, 3a cutting edge of portion along thinning flute, 3b outer end of cutting edge, 4 spiral flute, 4a drill rotational direction front portion, 4b terminal of portion of spiral flute formed along second circle, 5 thinning flute, 6 margin portion, 7 peripheral cutting edge, 8 chisel edge, 9 chamfer, C reference line, L straight line parallel to reference line, O drill center, S1 first circle, S2 second circle, S3 third circle, S4 fourth circle, R radius of first circle, R1 radius of second circle, γ radial rake, θ flute spread angle, α rake angle of peripheral cutting edge, H protrusion of terminal 4b from drill rotational direction front portion.

BEST MODES FOR CARRYING OUT THE INVENTION

An embodiment of the twist drill according to the present invention is now described with reference to FIGS. 1 to 6 of the accompanying drawings. This twist drill has cutting edges 3 forming concave curves in end view shown in FIG. 2 on the forward end of a drill body 1. Cutting edges 3 are provided on both sides of a drill center O in point symmetrical shapes respectively.

Figure 1:
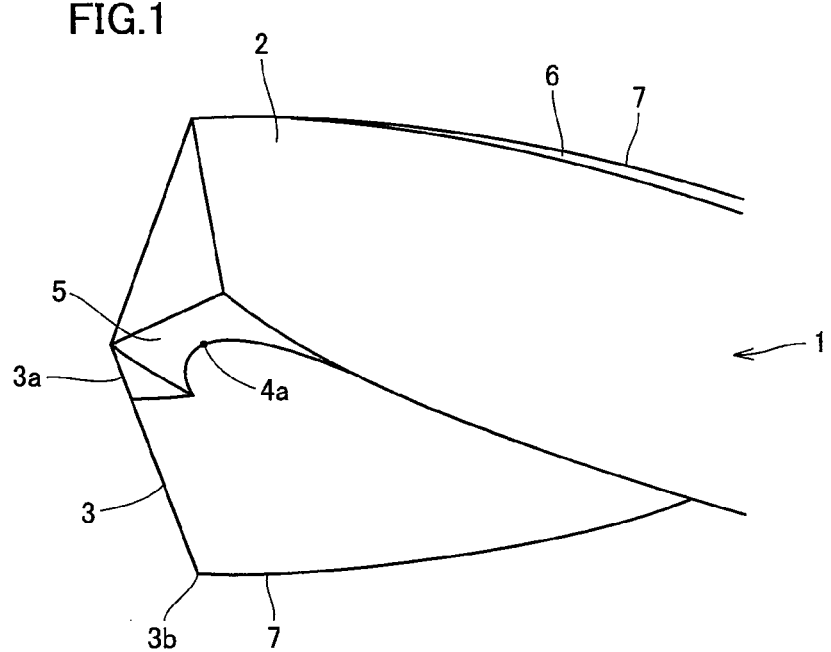
FIG. 1 is a side view showing a principal part of an example of the drill according to the present invention.
Figure 2:
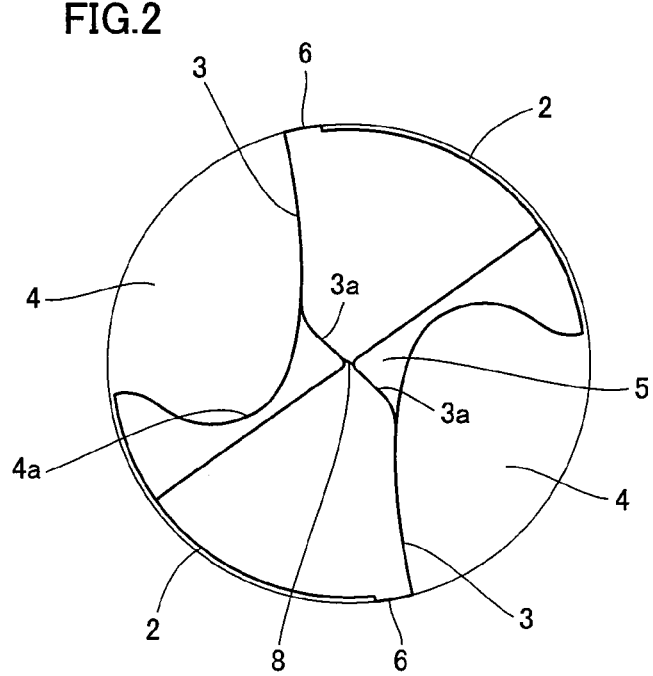
FIG. 2 is an enlarged drill axis end view of the drill shown in FIG. 1.

Two spiral flutes 4 shown in FIGS. 1 and 2 are provided on the periphery of drill body 1, and thinning flutes 5 reducing the width of a chisel edge 8 are provided on two portions in central symmetrical states on the front portion of drill body 1, as shown in FIG. 2. 3a denotes cutting edges of portions along thinning flutes 5.

Figure 3:
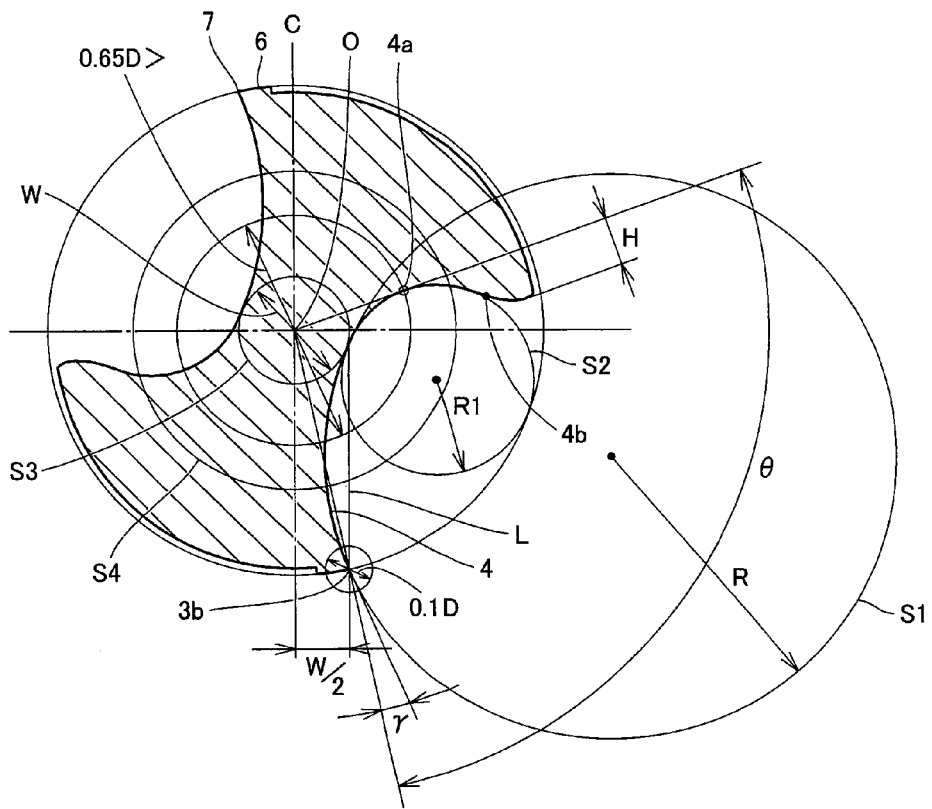
FIG. 3 is an illustrative auxiliary diagram showing a drill axis-perpendicular section in a simplified manner.
Figure 4:
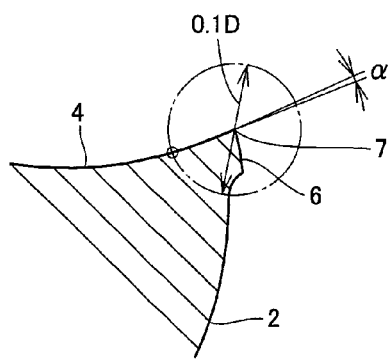
FIG. 4 is a sectional view showing the rake angle of a peripheral cutting edge.

FIG. 3 is an auxiliary diagram showing a drill axis-perpendicular sectional shape in a simplified manner, and the following description is made with reference to FIG. 3. C in FIG. 3 denotes a reference line bisecting the drill in the circumferential direction in drill axis-perpendicular sectional view. The sectional shapes of the right and left halves along reference line C are identical to each other.

As to each spiral flute 4, the sectional area of this spiral flute is so insufficient that dischargeability for chips is hard to increase if a flute spread angle θ is not more than 79°. Further, the area of a land portion 2 is so insufficient that it is difficult to ensure strength of the drill if flute spread angle θ is at least 111°, and hence flute spread angle θ is set to the range of 80° to 110°, in order to avoid this problem.

A region of spiral flute 4 taking part in chip control is formed along a first circle S1 and a second circle S2. First circle S1 is a circle along cutting edge 3 of the concave curve in FIG. 2, and circumscribed on a third circle S3 expressing the web thickness W. Second circle S2 is inscribed with respect to first circle S1, and circumscribed on third circle S3.

The radius R of first circle S1 is in the range of 0.40 D to 0.70 D (D: drill diameter), and the radius R1 of second circle S2 is in the range of 0.15 D to 0.30 D. Radius R of first circle S1 is 1.3 to 4.6 times as large as radius R1 of second circle S2.

The quantity of entrance (quantity of indentation) of cutting edge 3 into a drill rotational direction back portion from a straight line L (this is parallel to reference line C) coming into contact with third circle S3 on one point and reaching an outer end 3b of the cutting edge increases and a radial rake γ of the peripheral portion increases as radius R of first circle S1 is reduced. Radial rake γ of the peripheral portion of cutting edge 3 is set to 1 to 20° of a range assumed to be preferable. Radial rake γ of the cutting edge peripheral portion mentioned here is defined by an angle formed by a straight line connecting outer end 3b of cutting edge 3 and a position returning toward the drill center up to a portion corresponding to 5% of drill diameter D therefrom with each other and a straight line connecting drill center O and outer end 3b of cutting edge 3 with each other. Radial rake γ is equal to rake angle α of a peripheral cutting edge 7 shown in FIG. 4, and this angle is preferably set to at least 1° in order to exhibit effects of improving sharpness of peripheral cutting edge 7 and controlling flow of chips without insufficiency. Strength of the peripheral cutting edge so lowers that it is impossible to cope therewith by reinforcing chamfering or the like if the angle is excessively increased, and hence the upper limit is preferably set to about 20°.

A drill rotational direction front portion 4a of spiral flute 4 is formed on second circle S2. Drill rotational direction front portion 4a is closer to the drill center than a fourth circle S4. Fourth circle S4 is a circle concentric with the drill center and having a diameter of 0.65 D. Drill rotational direction front portion 4a is so formed along second circle S2 having a small radius and approximated to the drill center as to easily entrain chips formed by the cutting edge of the concave curve (improve curling property) while also smoothly discharging the chips formed by cutting edge 3a of each thinning flute portion, for exhibiting these functions in a balanced manner and increasing coping ability with respect to changes in working conditions and workpiece characteristics.

Wantless strength can be obtained when setting web thickness W to at least 0.18 D. The sectional area of spiral flute 4 is so insufficient that the dischargeability for the chips deteriorates if web thickness W is excessive, and hence the upper limit of web thickness W is preferably set to about 0.32 D.

When a terminal 4b of a portion of spiral flute 4 formed along second circle S2 is protruded toward the drill rotational direction back portion beyond drill rotational direction front portion 4a, the chips hardly flow toward the outer diameter side beyond aforementioned terminal 4b to be smoothly discharged. Current protrusion H of terminal 4b from drill rotational direction front portion 4a is preferably set to about 0.02 D to 0.05 D. The effect of protruding the terminal is small if protrusion H is not more than 0.02 D, while strength reduction of a heel portion or the like easily takes place if the same is at least 0.05 D.

Figure 5:
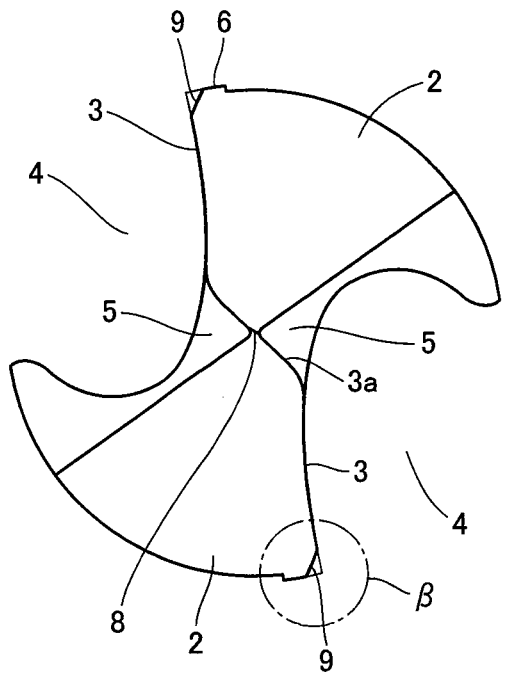
FIG. 5 is an enlarged end view of a drill according to another embodiment.
Figure 6:
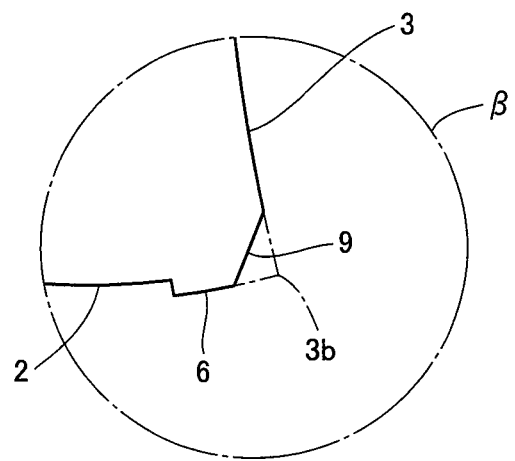
FIG. 6 is an end view showing a region β in FIG. 5 in an enlarged manner.

FIGS. 5 and 6 show an example performing reinforcement of peripheral cutting edge 7. If a problem arises in the strength of peripheral cutting edge 7 due to the increase of rake angle α, a chamfer 9 may be so provided as to reinforce peripheral cutting edge 7, as shown in FIGS. 5 and 6.

workpieces is required, whereby the variety of the drill so reduces that it is also possible to reduce the manufacturing cost.

EXAMPLE

A performance evaluation test of the drill according to the present invention was conducted. Results thereof are shown below. In the test, cutting was performed with drills of test pieces Nos. 1 to 12 shown in Table 1 under the following conditions. Each of the drills of the test pieces Nos. 1 to 12 is a drill with an oil hole having a diameter of φ8 mm, an effective length of cut of 55 mm and a total length of 110 mm.

Among the 12 drills of the test pieces, Nos. 3 to 5 and 8 to 10 are inventive drills.

Workpiece: S50C (Brinell hardness HB230)

Cutting conditions: cutting speed Vc=80 m/min., feed rate f=0.30 mm/rev, worked hole depth H=40 mm, internal lubrication In this evaluation test, the test pieces were evaluated as to four items including 1) chip shape (length and shape), 2 chip dischargeability (spindle load current value of process machine), 3) damage of cutting edge periphery (chipped state) and 4) cutting resistance (torque). Table 1 also shows the results thereof.

TABLE 1

| | Shape of Spiral Flute | | | | Results of Evaluation | | | |
| | | | | | | | Damage of | |
| Test Piece No. | Radius R | Radius R1 | Flute Spread Angle | Diameter of Fourth Circle | Peripheral Rake Angle α | Chip Shape | Chip Dischargeability | Cutting edge Periphery | Cutting Resistance (Torque) |
|---|---|---|---|---|---|---|---|---|---|
| 1 | 0.3D | 0.20D | 78° | 0.496D | 24° | B | B | chipped | A |
| 2 | 0.4D | 0.13D | 76° | 0.447D | 16° | B | C | no problem | A |
| 3 | 0.4D | 0.15D | 80° | 0.472D | 16° | B | A | no problem | A |
| 4 | 0.4D | 0.23D | 86° | 0.563D | 16° | A | A | no problem | A |
| 5 | 0.4D | 0.30D | 91° | 0.612D | 16° | A | B | no problem | A |
| 6 | 0.4D | 0.35D | 94° | 0.684D | 16° | C | B | no problem | A |
| 7 | 0.7D | 0.13D | 88° | 0.448D | 5° | B | C | no problem | B |
| 8 | 0.7D | 0.15D | 91° | 0.465D | 5° | B | A | no problem | B |
| 9 | 0.7D | 0.23D | 98° | 0.570D | 5° | A | A | no problem | B |
| 10 | 0.7D | 0.30D | 102° | 0.627D | 5° | A | B | no problem | B |
| 11 | 0.7D | 0.35D | 106° | 0.675D | 5° | C | B | no problem | B |
| 12 | 0.8D | 0.20D | 104° | 0.530D | −3° | B | B | no problem | C |

According to the aforementioned structure, thickness changes are caused in the chips formed by the cutting edge shape of the concave curve, and positive radial rake γ is provided on the peripheral portion of the cutting edge so that the flow of the formed chips is controlled. Further, the drill rotational direction front portion of the spiral flute is positioned closer to the drill center than the fourth circle concentric with the drill center and having the diameter of 0.65 D, whereby chips scraped by the cutting edge of the concave curve reach the drill rotational direction front portion while discharge energy is relatively large, to be excellently controlled by a flute wall formed along the second circle. In addition, chips scraped by the cutting edge of the thinning flute portion also flow into the spiral flute with small resistance, and it is possible to cope with extensive changes in working conditions and extensive changes in workpiece characteristics by the same drill due to these synergistic effects.

Figure 7:
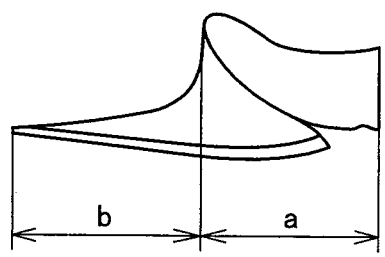
FIG. 7 is a diagram showing a dimensional ratio for chip shape evaluation.

Further, the copeable range so spreads that neither design responsive to conditions nor design responsive to the types of Determination of chip shape . . . ratio between a and b in FIG. 7 A: a>b, B: a=b, C: a<b Spindle current value . . . difference between leading part and hole inner part A: not more than 5% rise, B: not more than 10% rise, C: in excess of 10% rise Cutting resistance (torque) . . . numerical evaluation A: not more than 450 Ncm, B: not more than 480 Ncm, C: in excess of 450 Ncm As understood from these test results, the drills (samples Nos. 3 to 5 and 8 to 10) according to the present invention can obtain satisfiable performance in all evaluated items.

The embodiment and Example disclosed this time are to be considered illustrative in all points, and not restrictive. The range of the present invention is shown not by the above description but by the scope of claims for patent, and it is intended that all modifications within the meaning and range equivalent to the scope of claims for patent are included.

The invention claimed is:
1. A twist drill having a cutting edge forming a concave curve in drill axis end view, a spiral flute having a flute spread angle set to the range of 80° to 110° in drill axis-perpendicular sectional view, and a thinning flute reducing the width of a chisel edge, wherein a region of said spiral flute taking part in chip control is formed along a first circle along said cutting edge and a second circle inscribed in the first circle in drill axis-perpendicular sectional view, said first circle and the second circle are both tangent at the same point on a third circle expressing the web thickness, the radius R of said first circle is in the range of 0.40 D to 0.70 D and the radius R1 of said second circle is in the range of 0.15 D to 0.30 D respectively assuming that D represents the drill diameter, and a drill rotational direction front portion of said spiral flute is formed on said second circle to be closer to the drill center than a fourth circle concentric with the drill center and having a diameter of 0.65 D.

2. The twist drill according to claim 1, having a margin portion and a peripheral cutting edge formed by a leading edge of the margin portion, wherein the rake angle α of said peripheral cutting edge is set positive.

3. The twist drill according to claim 2, performing cutting edge reinforcement by chamfering on said peripheral cutting edge.

* * * * *

UNITED STATES PATENT AND TRADEMARK OFFICE
CERTIFICATE OF CORRECTION

| | |
|---|---|
| PATENT NO. | : 8,545,141 B2 |
| APPLICATION NO. | : 12/681714 |
| DATED | : October 1, 2013 |
| INVENTOR(S) | : Masaaki Jindai et al. |

It is certified that error appears in the above-identified patent and that said Letters Patent is hereby corrected as shown below:

On the Title Page

In Item "(75) Inventors," the Inventor's name should read --Masaaki JINDAI-- rather than "Masaki JINDAI."

Signed and Sealed this
Twentieth Day of May, 2014

Michelle K. Lee
*Deputy Director of the United States Patent and Trademark Office*